United States Patent
Li et al.

(10) Patent No.: US 12,524,467 B2
(45) Date of Patent: Jan. 13, 2026

(54) METHODS AND APPARATUSES FOR INSERTING DATA INTO GRAPH DATABASE

(71) Applicant: Alipay (Hangzhou) Information Technology Co., Ltd., Zhejiang (CN)

(72) Inventors: Mengyu Li, Hangzhou (CN); Zewei Chen, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/493,376

(22) Filed: Oct. 24, 2023

(65) Prior Publication Data
US 2024/0143658 A1    May 2, 2024

(30) Foreign Application Priority Data
Nov. 1, 2022   (CN) .......................... 202211355677.8

(51) Int. Cl.
*G06F 7/02*      (2006.01)
*G06F 16/00*     (2019.01)
(Continued)

(52) U.S. Cl.
CPC ...... *G06F 16/9024* (2019.01); *G06F 16/2379* (2019.01); *G06F 16/21* (2019.01); *G06F 16/283* (2019.01)

(58) Field of Classification Search
CPC .... G06F 16/9024; G06F 16/21; G06F 17/283; G06F 16/2379; G06F 16/283
See application file for complete search history.

(56) References Cited

U.S. PATENT DOCUMENTS

| | | | |
|---|---|---|---|
| 2021/0218760 A1* | 7/2021 | Lee | .................... G06Q 20/4016 |
| 2023/0095703 A1* | 3/2023 | Czipo | ................. G06F 16/2365 |
| | | | 707/687 |

FOREIGN PATENT DOCUMENTS

| | | | | |
|---|---|---|---|---|
| CN | 115495620 A | * | 12/2022 | ........... G06F 16/288 |
| CN | 116108245 | | 5/2023 | |

OTHER PUBLICATIONS

On Duplicate Key Update same as Insert, article on stackoverflow.com by user Roy from Jan. 17, 2013, answers from Jan. 17, 2013, retrieved from https://stackoverflow.com/questions/14383503/on-duplicate-key-update-same-as-insert on Feb. 28, 2025. (Year: 2013).*

(Continued)

*Primary Examiner* — Bruce M Moser
(74) *Attorney, Agent, or Firm* — Fish & Richardson P.C.

(57) ABSTRACT

To insert data into a graph database, an insert statement for a target graph database is received, where the insert statement includes at least an insert keyword and several element definition lists corresponding to several graphic elements including nodes and/or edges. The several element definition lists describe respective element identifiers of the several graphic elements and object types of objects represented by the several graphic elements, and each element definition list includes each attribute value of each pre-described attribute of a corresponding graphic element. The insert statement is executed, including forming each data row corresponding to each graphic element based on each attribute value in each element definition list and determining a primary key value of a corresponding data row based on an element identifier and an object type of each graphic element. Each data row is inserted into the target graph database based on the primary key value.

17 Claims, 3 Drawing Sheets

(51) Int. Cl.
  *G06F 16/23*    (2019.01)
  *G06F 16/901*   (2019.01)
  *G06F 16/21*    (2019.01)
  *G06F 16/28*    (2019.01)

(56) References Cited

OTHER PUBLICATIONS blog.csdn.net [online], "Resolve conflicts between data insertion and primary keys in MySQL," May 18, 2017, retrieved on Jan. 31, 2024, retrieved from URL<https://www.runoob.com/mysql/mysql-insert-query.html>, 6 pages (with English machine translation).

nebula-graph.com [online], "insert edge," available on or before May 26, 2022, via Internet Archive: Wayback Machine URL <https://web.archive.org/web/20240000000000*/https://docs.nebula-graph.com.cn/3.1.0/3.ngql-guide/13.edge-statements/1.insert-edge/>, retrieved on Jan. 31, 2024, URL<https://docs.nebula-graph.com.cn/3.1.0/3.ngql-guide/13.edge-statements/1.insert-edge/>, 3 pages (with English machine translation).

nebula-graph.com [online], "insert vertex," available on or before May 28, 2022, via Internet Archive: Wayback Machine URL <https://web.archive.org/web/20240000000000*/https://docs.nebula-graph.com.cn/3.1.0/3.ngql-guide/12.vertex-statements/1.insert-vertex/>, retrieved on Jan. 31, 2024, URL<https://docs.nebula-graph.com.cn/3.1.0/3.ngql-guide/12.vertex-statements/1.insert-vertex/>, 4 pages (with English machine translation).

neo4j.com [online], "create," available on or before Nov. 11, 2019, via Internet Archive: Wayback Machine URL <https://web.archive.org/web/20240000000000*/https://neo4j.com/docs/cypher-manual/current/clauses/create/>, retrieved on Jan. 31, 2024, URL<https://neo4j.com/docs/cypher-manual/current/clauses/create/>, 6 pages.

runoob.com [online], "MySQL inserts the data," available on or before Jul. 9, 2015, via Internet Archive: Wayback Machine URL <https://web.archive.org/web/20240000000000*/https://www.runoob.com/mysql/mysql-insert-query.html>, retrieved on Jan. 31, 2024, URL<https://www.runoob.com/mysql/mysql-insert-query.html>, 6 pages (with English machine translation).

* cited by examiner

METHODS AND APPARATUSES FOR INSERTING DATA INTO GRAPH DATABASE

CROSS-REFERENCE TO RELATED APPLICATIONS

This application claims priority to Chinese Patent Application No. 202211355677.8, filed on Nov. 1, 2022, which is hereby incorporated by reference in its entirety.

TECHNICAL FIELD

One or more embodiments of this specification relate to the database field, and in particular, to methods and apparatuses for inserting data into a graph database.

BACKGROUND

Existing methods for inserting data into a graph database do not support node or edge insertion, or can support node or edge insertion but cannot support primary key creation for inserted data and data update upon a primary key conflict. Therefore, a more reliable method for inserting data into a graph database needs to be provided. The data here can include privacy data.

SUMMARY

One or more embodiments of this specification describe methods for inserting data into a graph database. The methods can support insertion of different types of graphic elements into the graph database, and can support creation of a primary key value for the inserted data.

According to a first aspect, a method for inserting data into a graph database is provided, including: receiving an insert statement for a target graph database, where the insert statement includes at least an insert keyword and several element definition lists corresponding to several graphic elements; the graphic elements include nodes and/or edges; and the several element definition lists are used to describe respective element identifiers of the several graphic elements and object types of objects represented by the several graphic elements, and each element definition list includes each attribute value of each pre-described attribute of a corresponding graphic element; and executing the insert statement, including forming each data row corresponding to each graphic element based on each attribute value in each element definition list, and determining a primary key value of a corresponding data row based on an element identifier and an object type of each graphic element; and inserting each data row into the target graph database based on the primary key value.

According to a second aspect, an apparatus for inserting data into a graph database is provided, including: a receiving unit, configured to receive an insert statement for a target graph database, where the insert statement includes at least an insert keyword and several element definition lists corresponding to several graphic elements; the graphic elements include nodes and/or edges; and the several element definition lists are used to describe respective element identifiers of the several graphic elements and object types of objects represented by the several graphic elements, and each element definition list includes each attribute value of each pre-described attribute of a corresponding graphic element; and an execution unit, configured to execute the insert statement, including forming each data row corresponding to each graphic element based on each attribute value in each element definition list, and determining a primary key value of a corresponding data row based on an element identifier and an object type of each graphic element; and inserting each data row into the target graph database based on the primary key value.

According to a third aspect, a computer storage medium is provided. The computer storage medium stores a computer program, and when the computer program is executed in a computer, the computer is enabled to perform the method of the first aspect.

According to a fourth aspect, a computing device is provided, including a storage and a processor. The storage stores executable code, and when executing the executable code, the processor implements the method of the first aspect.

According to the methods and apparatuses for inserting data into a graph database provided in one or more embodiments of this specification, an insert statement can include several element definition lists corresponding to several graphic elements, and each element definition list is used to describe an element identifier of a corresponding graphic element and an object type of an object represented by the graphic element. Then, a primary key value of a data row corresponding to the graphic element can be determined based on the element identifier and the object type of the graphic element, and the data row corresponding to the graphic element can be inserted into the graph database based on the primary key value. In other words, this solution supports creation of a primary key value for an inserted data row. As such, conflict detection on a data row can be performed based on the primary key value, and therefore correctness of data insertion can be ensured. In addition, this solution supports simultaneous insertion of different types of graphic elements.

BRIEF DESCRIPTION OF DRAWINGS

To describe technical solutions in embodiments of this specification more clearly, the following briefly describes the accompanying drawings needed for describing the embodiments. Clearly, the accompanying drawings in the following description merely show some embodiments of this specification, and a person of ordinary skill in the art can still derive other drawings from these accompanying drawings without creative efforts.

DESCRIPTION OF EMBODIMENTS

The following describes the solutions provided in this specification with reference to the accompanying drawings.

As described above, existing methods for inserting data into a graph database do not support node or edge insertion, or can support node or edge insertion but cannot support primary key creation for inserted data and data update upon a primary key conflict. The solutions optimize a syntax of a graph query language, and therefore can support insertion of different types of graphic elements into a graph database, and can support creation of primary key values for the inserted data.

Figure 1:
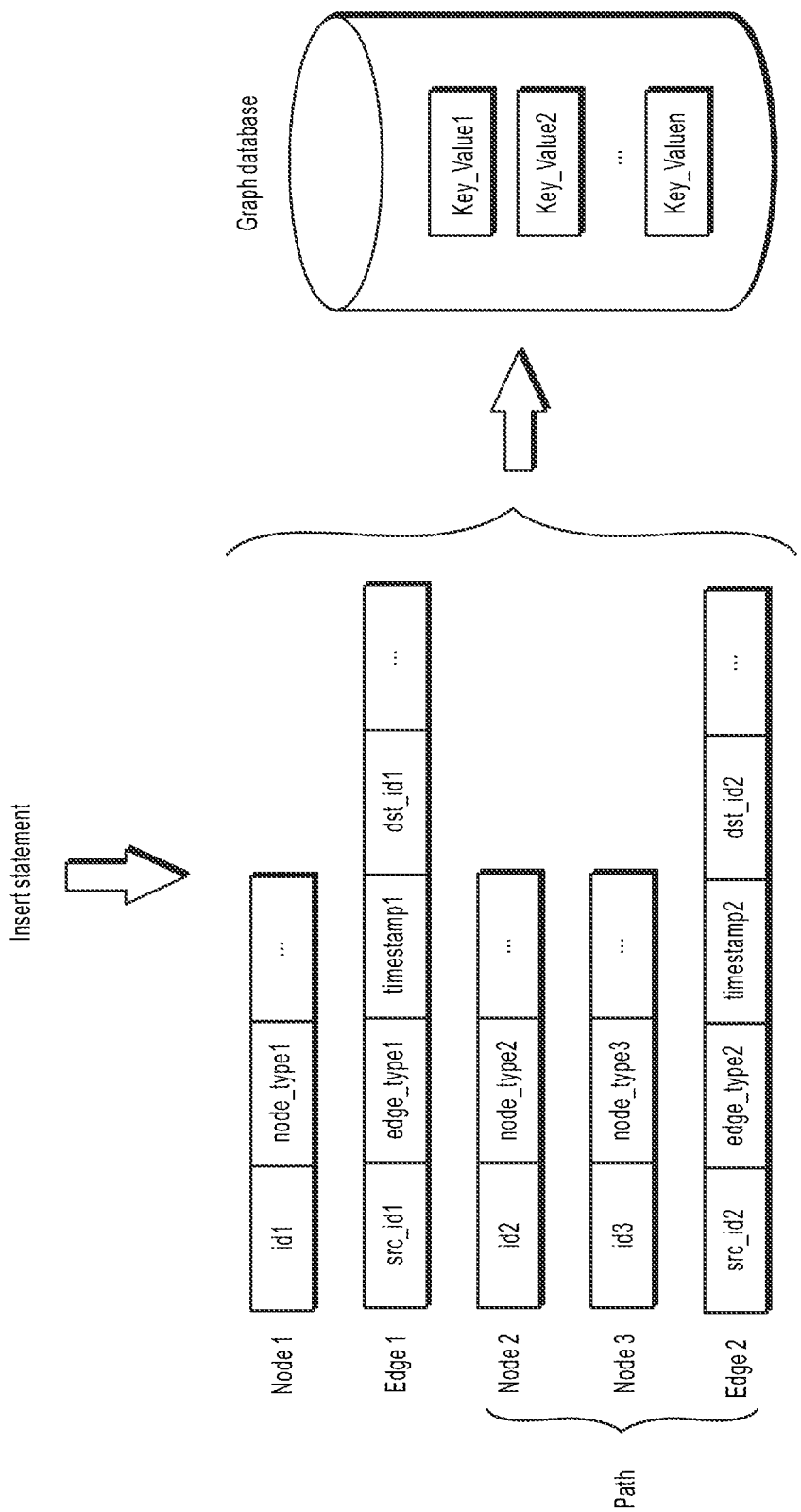
FIG. 1 is a schematic diagram illustrating an implementation scenario, according to some embodiments disclosed in this specification.

FIG. 1 is a schematic diagram illustrating an implementation scenario, according to some embodiments disclosed in this specification. In FIG. 1, an apparatus for inserting data can receive an insert statement sent by a client. The insert statement includes at least an insert keyword and several element definition lists corresponding to several graphic elements. The several element definition lists are used to describe respective element identifiers of the several graphic elements and object types of objects represented by the several graphic elements, and each element definition list includes each attribute value of each pre-described attribute of a corresponding graphic element. It should be understood that, a data row corresponding to a graphic element can be obtained based on each attribute value of each pre-described attribute of the graphic element.

It is worthwhile to note that the several graphic elements can include nodes and/or edges. In other words, the apparatus for inserting data can insert a data row (a node type (node_type), a node identifier (id), and another attribute value) corresponding to a node into a graph database, or can insert a data row (an edge type (edge_type), a start identifier (src_id), an end identifier (dst_id), a time stamp (timestamp), and another attribute value) corresponding to an edge into the graph database. The data rows corresponding to the node and the edge can be inserted simultaneously.

Specifically, for a data row corresponding to a node or an edge, a primary key value of the corresponding data row can be determined based on an element identifier and an object type that are described in an element definition list of the node or the edge. Then, the data row corresponding to the node or edge is inserted into the graph database based on the primary key value.

It is worthwhile to note that, because a path is formed by a node and an edge, the solutions support simultaneous insertion of a node and an edge, and can also support insertion of a path.

In addition, in an example, a data row corresponding to a node or an edge can be stored in the graph database in a form of a Key_Value pair. A value of Key can be a primary key value, and a value of Value can be an attribute value other than the primary key value.

The following describes a syntax format of the above-mentioned insert statement.

The insert statement can be specifically expressed as follows:
<insert statement>::=
   INSERT <simple graph pattern>[ON DUPLICATE KEY UPDATE <update item list>]

INSERT is the insert keyword, and <simple graph pattern> is a graph pattern list, which can include several element definition lists. The graph pattern list is used to describe a node, an edge, or a path. The insert statement can usually include multiple graph pattern lists, and the multiple graph pattern lists are separated by a comma.

In addition, ON DUPLICATE KEY UPDATE in the above-mentioned syntax is a conflict detection clause, which is used to determine whether a target data row conflicting with a primary key value of an inserted data row already exists in each to-be-inserted data row, and modify the target data row when the target data row exists. The conflict detection clause can include a to-be-modified target attribute and a modified target attribute value or a modification expression. Here, the to-be-modified target attribute and the modified target attribute value or the modification expression can be described by using <update item list>.

Figure 2:
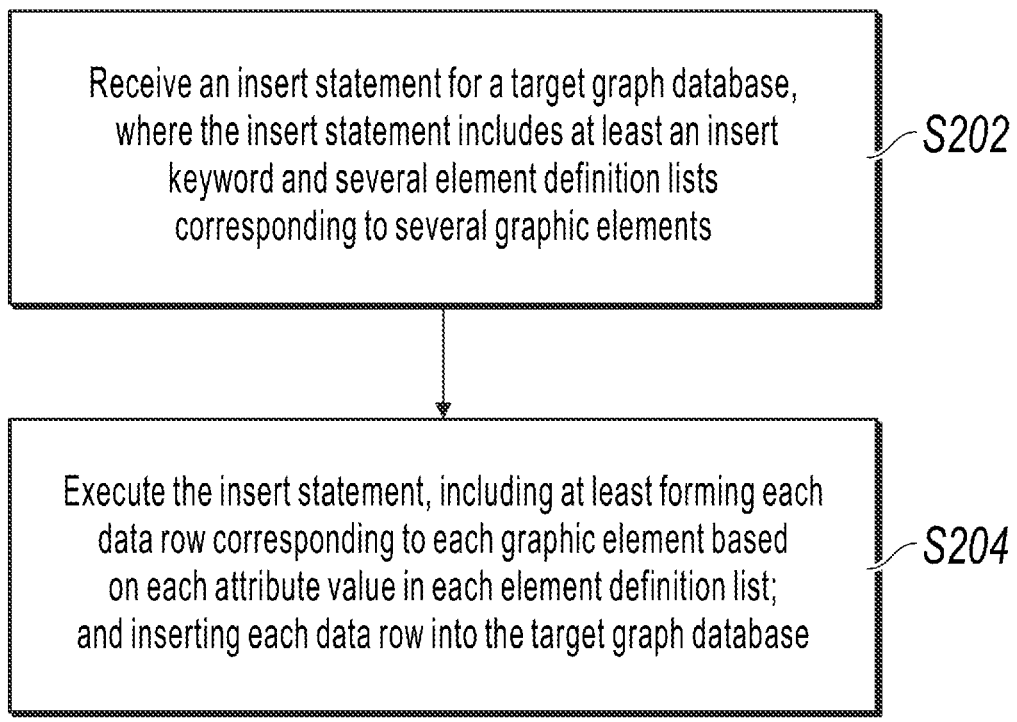
FIG. 2 is a flowchart illustrating a method for inserting data into a graph database, according to some embodiments.

FIG. 2 is a flowchart illustrating a method for inserting data into a graph database, according to some embodiments. The method can be performed by any system, device, platform, apparatus, or device cluster with computing and processing capabilities. As shown in FIG. 2, the method can include the following steps.

Step 202: Receive an insert statement for a target graph database, where the insert statement includes at least an insert keyword and several element definition lists corresponding to several graphic elements.

Any of the above-mentioned graphic elements include a node and/or an edge. The several element definition lists are used to describe respective element identifiers of the several graphic elements and object types of objects represented by the several graphic elements, and each element definition list includes each attribute value of each pre-described attribute of a corresponding graphic element.

In an example, the several element definition lists corresponding to the several graphic elements include a first node definition list corresponding to a first node; and the first node definition list includes a first node identifier of the first node and a first entity type of an entity represented by the first node.

For example, the insert statement can be as follows:
  INSERT (:person{id:10, name:"shensi", age:27, company:"ant"})

In this example, the insert statement includes the first node definition list, and the first node definition list is represented by a predetermined pair of symbols "()", where "person" is the entity type of the entity represented by the first node, and "id" is the node identifier of the first node. It is worthwhile to note that "id", "name", "age", and "company" located in "{ }" described above are collectively referred to as attributes, and "10", "shensi", "27", and "ant" that correspond to the above-mentioned attributes are collectively referred to as attribute values. Certainly, in actual applications, the above-mentioned entity type can also be referred to as an attribute of a graphic element. This specification sets no limitation thereto.

It is worthwhile to note that attributes can be pre-described for different entity types, and corresponding default attribute values can be set for at least some of the attributes so that the default attribute values can be directly used when the first node definition list does not include corresponding attribute values.

In actual applications, in addition to the first node definition list, the several element definition lists further include a second node definition list corresponding to a second node. The second node definition list includes a second node identifier of the second node and a second entity type of an entity represented by the second node.

The first node identifier in the first node definition list is different from the second node identifier in the second node definition list; and/or the first entity type in the first node definition list is different from the second entity type in the second node definition list.

In other words, the node identifiers respectively included in the two node definition lists are different, and/or the entity types respectively included in the two node definition lists are different. The following provides descriptions with reference to examples.

Example 1

INSERT (:student{id:10, name:"jason", age:30, class:"3-2"}), (:student{id:20, name:"joy", age:28, class:"6-1"})

In this example, both of entity types respectively included in two node definition lists are "student", and a node identifier included in the former node definition list is "10", and a node identifier included in the latter node definition list is "20".

In other words, in this example, the two node definition lists include the same entity type but different node identifiers.

Example 2

INSERT (:student{id:10, name:"jason", age:30, class:"3-2"}), (:book{id:10, name:"C++ Primer (5th Edition)", publication_time:"Aug. 6, 2012", count:1714113})

In this example, both of node identifiers respectively included in two node definition lists are "10", and an entity type included in the former node definition list is "student", and an entity type included in the latter node definition list is "book".

In other words, in this example, the two node definition lists include the same node identifier but different entity types.

Example 3

INSERT (:student{id:10, name:"jason", age:30, class:"3-2"}), (:book{id:9780, name:"Harry Potter and the Philosopher's Stone", publication_time:"Jun. 26, 1997", count:589628513})

In this example, an entity type and a node identifier included in the former node definition list are respectively "student" and "10", and an entity type and a node identifier included in the latter node definition list are respectively "book" and "9780".

In other words, in this example, the two node definition lists include different node identifiers and different entity types.

It is worthwhile to note that in Example 1 to Example 3 described above, each node definition list separately forms one graph pattern list, and the graph pattern list is used to describe a node.

In addition, the insert statements in Example 1 to Example 3 each include two graph pattern lists used to describe nodes. Such practice can be understood as follows: the solutions provided in the embodiments of this specification support simultaneous insertion of two nodes. Certainly, in actual applications, simultaneous insertion of more nodes can be further supported. Details are omitted here for simplicity in this specification.

It is worthwhile to further note that, in actual applications, the first node definition list can further include a first variable name, and the second node definition list can further include a second variable name; and the first variable name is different from the second variable name.

For example, Example 1 described above can further be as follows:
INSERT (s1:student{id:10, name:"jason", age:30, class:"3-2"}), (s2:student{id:20, name:"joy", age:28, class:"6-1"})

In this example, s1 and s2 are two different variable names respectively included in the two node definition lists.

In another example, the several element definition lists corresponding to the several graphic elements include a first edge definition list corresponding to a first edge; the first edge definition list includes a first start identifier of a start node on the first edge, a first end identifier of an end node on the first edge, and a first relationship type of a relationship represented by the first edge. The first start identifier and the first end identifier form a first edge identifier of the first edge.

For example, the insert statement can be as follows:
INSERT ( )-[:friend{src_id:10, dst_id:20, timestamp:0, intimacy:100}]→( )

In this example, the insert statement includes the first edge definition list, and the first edge definition list is represented by a predetermined pair of symbols "[ ]", and "friend" is the relationship type of the relationship represented by the first edge, "src_id" is the start identifier of the start node of the first edge, "dst_id" is the end identifier of the end node of the first edge, and "timestamp" is a time stamp. It is worthwhile to note that "src_id", "dst_id", "timestamp", and "intimacy" located in "{ }" described above are collectively referred to as attributes, and "10", "20", "0", and "100" corresponding to the above-mentioned attributes are collectively referred to as attribute values. Certainly, in actual applications, the above-mentioned relationship type can also be referred to as an attribute of a graphic element. This specification sets no limitation thereto.

It is worthwhile to note that attributes can be pre-described for different relationship types, and corresponding default attribute values can be set for at least some of the attributes so that the default attribute values can be directly used when the first edge definition list does not include corresponding attribute values.

In actual applications, in addition to the first edge definition list, the several element definition lists further include a second edge definition list corresponding to a second edge; and the second edge definition list includes a second start identifier and a second end identifier of a start node and an end node on the second edge and a second relationship type of a relationship represented by the second edge.

The first start identifier in the first edge definition list is different from the second start identifier in the second edge definition list; and/or the first end identifier in the first edge definition list is different from the second end identifier in the second edge definition list; and/or the first relationship type in the first edge definition list is different from the second relationship type in the second edge definition list.

In other words, the start identifiers respectively included in the two edge definition lists are different, and/or the end identifiers respectively included in the two edge definition lists are different, and/or the relationship types respectively included in the two edge definition lists are different. The following provides descriptions with reference to examples.

Example 4

INSERT ( )-[:friend{src_id:10, dst_id:20, time stamp:0, intimacy:100}]→( ), ( )-[:friend{src_id:11, dst_id:20, timestamp:0, intimacy:39}]→( )

In this example, both of relationship types and both of end identifiers that are respectively included in two edge definition lists are respectively "friend" and "20", and a start identifier included in the former edge definition list is "10", and a start identifier included in the latter edge definition list is "20".

In other words, in this example, the two edge definition lists include the same relationship type and end identifier but different start identifiers.

Example 5

INSERT ( )-[:friend{src_id:10, dst_id:20, timestamp:0, intimacy:100}]→( ), ( )-[:friend {src_id:10, dst_id:21, timestamp:0, intimacy:-5}]→( )

In this example, both of relationship types and both of start identifiers that are respectively included in two edge definition lists are respectively "friend" and "10", and an end identifier included in the former edge definition list is "20", and an end identifier included in the latter edge definition list is "21".

In other words, in this example, the two edge definition lists include the same relationship type and start identifier but different end identifiers.

Example 6

INSERT ( )-[:friend{src_id:10, dst_id:20, timestamp:0, intimacy:100}]→( ), ( )-[:borrow {src_id:20, dst_id: 9780, timestamp:0, gmt_create:"20201102"}]→( )

In this example, in two edge definition lists, a relationship type, a start identifier, and an end identifier included in the former edge definition list are respectively "friend", "10", and "20", and a relationship type, a start identifier, and an end identifier included in the latter edge definition list are respectively "borrow", "20", and "9780".

In other words, in this example, the two edge definition lists include different relationship types, different start identifiers, and different end identifiers.

It is worthwhile to note that, in Example 4 to Example 6, each edge definition list is connected to two empty node definition lists by using predetermined connection signs "-" and "→" to form one graph pattern list. The graph pattern list is used to describe an edge (for example, a dangling edge).

In addition, the insert statements in Example 4 to Example 6 each include two graph pattern lists used to describe edges. Such practice can be understood as follows: the solutions provided in the embodiments of this specification support simultaneous insertion of two edges. Certainly, in actual applications, simultaneous insertion of more edges can be further supported. Details are omitted here for simplicity in this specification.

In addition, the solutions provided in the embodiments of this specification further support simultaneous insertion of both a node and an edge. Details are as follows:

Example 7

INSERT (:person{id:10, name:"xiaoming", age:30}), ( )-[:relation{timestamp:1563248870, src_id:10, dst_id:20}]→( )

In still another example, the several element definition lists include two non-empty node definition lists and an edge definition list connected between the two non-empty node lists by using predetermined connection signs (for example, "-" and "→"). The three definition lists form one graph pattern list, and the graph pattern list is used to describe a path. In other words, the path includes two nodes and one edge.

It is worthwhile to note that the edge definition list included in the graph pattern list used to describe a path does not have to include a start identifier and an end identifier, and the two identifiers can be determined based on node identifiers respectively included in the two node definition lists. The following provides descriptions with reference to examples.

Example 8

INSERT (:student{id:10, name:"jason", age:30, class:"3-2"})-[:friend{timestamp:0,intimacy:100}]→ (:student{id:20, name:"joy", age:28, class:"6-1"})

In this example, the insert statement includes only one graph pattern list. A path described by the graph pattern list includes two nodes and one edge. A start identifier and an end identifier included in an edge definition list used to describe this edge are respectively node identifiers respectively included in two node definition list: 10 and 20.

Certainly, the insert statement can include multiple graph pattern lists used to describe paths. Each graph pattern list includes several node definition lists and several edge definition lists. In other words, the solutions support simultaneous insertion of multiple paths, and each path can include several nodes and several edges. The following provides descriptions with reference to examples.

Example 9

INSERT (:student{id:10,name:"jason",age:30, class:"3-2"})-[:friend {timestamp:0, intimacy:100} ]→ (:student{id:20, name:"joy", age:28, class:"6-1"}), (:student{id:11, name:"barm", age:15, class:"1-1"})<-[:friend {timestamp:0,intimacy:-5}]-(:student{id:21, name:"tom", age:16, class:"1-2"})

In this example, the insert statement can simultaneously include two graph pattern lists used to describe paths. Each graph pattern list includes two node definition lists and one edge definition list. In other words, the insert statement can be used to insert two paths into the graph database at the same time. Each path includes two nodes and one edge.

It should be understood that the solutions further support simultaneous insertion of a node, an edge, and a path.

Example 10

INSERT (:student{id:10, name:"jason", age:30, class:"3-2"}), ( )-[:borrow{src_id:20, dst_id:9780, timestamp:0, gmt_create:"20201102"}]-( ); (:student{id:11, name: "barm", age:15, class:"1-1"})-[:friend{timestamp:0,intimacy:-5}]→(:student{id:21, name:"tom", age:16, class:"1-2"})

Step 204: Execute the insert statement.

The executing the insert statement includes at least the following: forming each data row corresponding to each graphic element based on each attribute value in each element definition list, and determining a primary key value of a corresponding data row based on an element identifier and an object type of each graphic element. Each data row is inserted into the target graph database based on the primary key value.

For example, a graphic element is a node, i.e., the several element definition lists include a node definition list, and the node definition list includes a node identifier of a node and an entity type of an entity represented by the node. The determining a primary key value of a corresponding data row can include determining a primary key value of a data row corresponding to the node based on the node identifier and the entity type.

For another example, a graphic element is an edge, i.e., the several element definition lists include an edge definition list, and the edge definition list includes a start identifier and an end identifier of a start node and an end node of an edge and a relationship type of a relationship represented by the edge. Here, the start identifier and the end identifier form an edge identifier of the edge. The determining a primary key value of a corresponding data row can include determining a primary key value of a data row corresponding to the edge based on the edge identifier and the relationship type.

Certainly, in actual applications, when the edge definition list further includes a time stamp, the primary key value of the data row corresponding to the edge can be determined based on a combination of the edge identifier, the relationship type, and the time stamp.

In addition, for an edge definition list that does not include a start identifier and an end identifier (for example, an edge definition list included in a graph pattern list used to describe a path), an edge identifier of an edge can be formed based on node identifiers in two node definition lists connected to the edge definition list by using predetermined connection signs. Then, a primary key value of a data row corresponding to the edge can be determined based on the edge identifier and a relationship type in the edge definition list.

Optionally, the insert statement described in the embodiments of this specification can further include a conflict detection clause, and the conflict detection clause is used to determine whether a target data row conflicting with a primary key value of an inserted data row already exists in each to-be-inserted data row, and modify the target data row when the target data row exists.

In an example, the conflict detection clause includes a to-be-modified target attribute and a modified target attribute value or a modification expression. The modifying the target data row can include modifying an attribute value (also referred to as an original attribute value) of the target attribute in the target data row to the target attribute value; or modifying an original attribute value of the target attribute in the target data row based on the modification expression.

For example, the insert statement can further be as follows:

INSERT (:person{id:10, name:"shensi", age:27, company:"ant"}) ON DUPLICATE KEY UPDATE name="shensi", age=age+1, company="ant"

A meaning of the insert statement is as follows: When a data row with an entity type of "person" and a node identifier of "10" already exists in the graph database, an attribute value of a "name" attribute in the data row is changed to "shensi", an attribute value of an "age" attribute is increased by 1, and an attribute value of a "company" attribute is changed to "ant". It should be understood that "age=age+1" in the above-mentioned insert statement is a modification expression.

In other words, based on the above-mentioned insert statement, fast data update can be implemented upon a conflict of a primary key value. In conventional technologies, a data update process for a conflict of a primary key value needs to include the following three steps: First, the graph database is searched for a conflicting data row based on the primary key value. Second, the conflicting data row is read. Third, the conflicting data row is updated.

Finally, when data are inserted in batches (for example, multiple nodes are inserted simultaneously, multiple edges are inserted simultaneously, or multiple nodes and multiple edges are inserted simultaneously, etc.) into the graph database, after the above-mentioned insert statement is executed, an operation result notification can be further returned, including at least a quantity of successfully inserted data rows in each to-be-inserted data row and a quantity of data rows with a conflicting primary key value or index value.

In conclusion, the methods for inserting data into a graph database provided in the embodiments of this specification support simultaneous insertion of multiple graphic elements of different types, thereby greatly improving user experience of the graph database. In addition, the solutions further support creation of a primary key value for an inserted data row, and can implement conflict detection based on the primary key value and quick update of a conflicting data row. Therefore, the solutions can alleviate a problem of low data insertion efficiency caused by a data insertion failure resulted from a conflict between some data and existing data when data are inserted into the graph database in batches.

Figure 3:
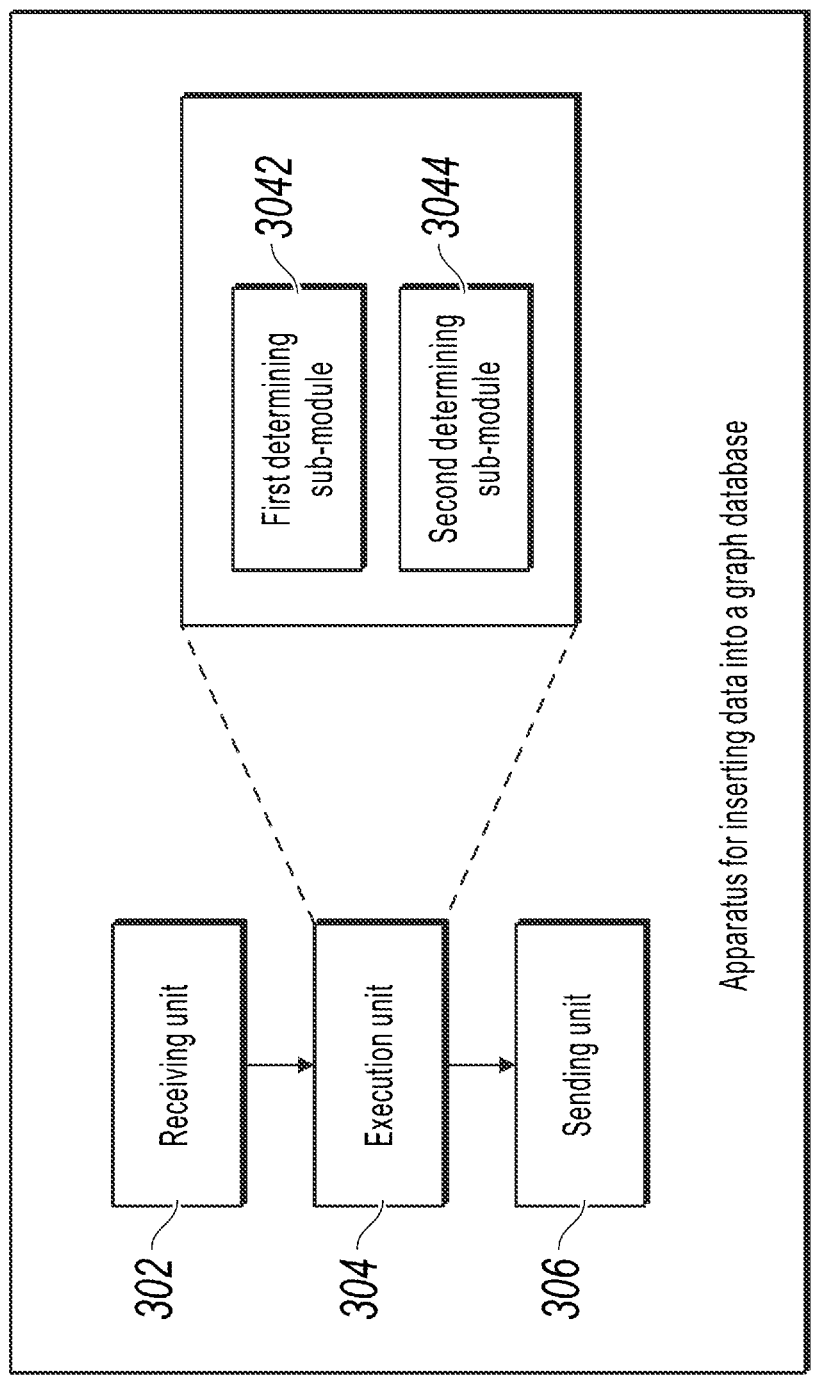
FIG. 3 is a schematic diagram illustrating an apparatus for inserting data into a graph database, according to some embodiments.

Corresponding to the method for inserting data into a graph database, one or more embodiments of this specification further provide an apparatus for inserting data into a graph database. As shown in FIG. 3, the apparatus can include a receiving unit 302 and an execution unit 304.

The receiving unit 302 is configured to receive an insert statement for a target graph database, where the insert statement includes at least an insert keyword and several element definition lists corresponding to several graphic elements. The graphic elements include nodes and/or edges. The several element definition lists are used to describe respective element identifiers of the several graphic elements and object types of objects represented by the several graphic elements, and each element definition list includes each attribute value of each pre-described attribute of a corresponding graphic element.

The execution unit 304 is configured to execute the insert statement, including forming each data row corresponding to each graphic element based on each attribute value in each element definition list, and determining a primary key value of a corresponding data row based on an element identifier and an object type of each graphic element. Each data row is inserted into the target graph database based on the primary key value.

Optionally, the insert statement further includes a conflict detection clause, and the conflict detection clause is used to determine whether a target data row conflicting with a primary key value of an inserted data row already exists in each to-be-inserted data row, and modify the target data row when the target data row exists.

The conflict detection clause includes a to-be-modified target attribute and a modified target attribute value or a modification expression.

The execution unit 304 is specifically configured to modify an attribute value of the target attribute in the target data row to the target attribute value; or modify an attribute value of the target attribute in the target data row based on the modification expression.

Optionally, the apparatus further includes the following: a sending unit 306, configured to return an operation result notification including at least a quantity of successfully inserted data rows in each data row and a quantity of data rows with a conflicting primary key value.

Optionally, the several element definition lists corresponding to the several graphic elements include a first node definition list corresponding to a first node. The first node definition list includes a first node identifier of the first node and a first entity type of an entity represented by the first node.

The execution unit 304 includes the following: a first determining sub-module 3042, configured to determine a primary key value of a data row corresponding to the first node based on the first node identifier and the first entity type.

Optionally, the several element definition lists further include a second node definition list corresponding to a second node. The second node definition list includes a second node identifier of the second node and a second entity type of an entity represented by the second node. The first node identifier is different from the second node identifier, and/or the first entity type is different from the second entity type.

Optionally, the first node definition list further includes a first variable name, and the second node definition list further includes a second variable name; and the first variable name is different from the second variable name.

Optionally, the several element definition lists further include a third edge definition list connected between the first node definition list and the second node definition list by using predetermined connection signs, and the third edge definition list includes a third relationship type of a relationship represented by a third edge; and the first node, the third edge, and the second node form a first path.

The first determining sub-module 3042 is further configured to form a third edge identifier of the third edge based on the first node identifier and the second node identifier; and determine a primary key value of a data row corresponding to the third edge based on the third edge identifier and the third relationship type.

Optionally, the several element definition lists corresponding to the several graphic elements include a first edge definition list corresponding to a first edge. The first edge definition list includes a first start identifier of a start node on the first edge, a first end identifier of an end node on the first edge, and a first relationship type of a relationship represented by the first edge. Here, the first start identifier and the first end identifier form a first edge identifier of the first edge.

The execution unit 304 includes the following: a second determining sub-module 3044, configured to determine a primary key value of a data row corresponding to the first edge based on the first edge identifier and the first relationship type.

Optionally, the first edge definition list further includes a first time stamp; and the second determining sub-module 3044 is specifically configured to determine the primary key value of the data row corresponding to the first edge based on a combination of the first edge identifier, the first relationship type, and the first time stamp.

Optionally, the several element definition lists further include a second edge definition list corresponding to a second edge. The second edge definition list includes a second start identifier and a second end identifier of a start node and an end node on the second edge and a second relationship type of a relationship represented by the second edge. The first start identifier is different from the second start identifier, and/or the first end identifier is different from the second end identifier, and/or the first relationship type is different from the second relationship type.

The functions of the functional modules of the apparatus in the above-mentioned embodiments of this specification can be implemented by performing the steps in the above-mentioned method embodiments. Therefore, a specific working process of the apparatus provided in the embodiments of this specification is omitted here for simplicity.

The apparatus for inserting data into a graph database provided in some embodiments of this specification can support insertion of different types of graphic elements into the graph database, and can support creation of a primary key value for the inserted data.

According to some embodiments of another aspect, a computer-readable storage medium is further provided. The computer-readable storage medium stores a computer program, and when the computer program is executed in a computer, the computer is enabled to perform the method described with reference to FIG. 2.

According to some embodiments of still another aspect, a computing device is further provided, including a storage and a processor. The storage stores executable code, and when executing the executable code, the processor implements the method described with reference to FIG. 2.

The embodiments in this specification are described in a progressive way. For same or similar parts of the embodiments, mutual references can be made to the embodiments. Each embodiment focuses on a difference from other embodiments. In particular, because the device embodiments are basically similar to the method embodiments, the device embodiments are relatively simply described. References can be made to the description of the method embodiment parts for relevant parts.

The methods or algorithm steps described with reference to the content disclosed in this specification can be implemented by hardware, or can be implemented by a processor by executing a software instruction. The software instruction can include corresponding software modules. The software modules can be stored in a random access memory (RAM), a flash memory, a read-only memory (ROM), an erasable programmable read-only memory (EPROM), an electrically erasable programmable read-only memory (EEPROM), a register, a hard disk, a portable hard disk, a compact disc read-only memory (CD-ROM), or any other form of storage medium known in the art. An example storage medium is coupled to a processor, so that the processor can read information from the storage medium and write information to the storage medium. Certainly, the storage medium can alternatively be a constituent part of the processor. The processor and the storage medium can be located in an application-specific integrated circuit (ASIC). In addition, the ASIC can be located in a server. Certainly, the processor and the storage medium can alternatively exist in the server as discrete components.

A person skilled in the art should be aware that in the above-mentioned one or more examples, functions described in this specification can be implemented by hardware, software, firmware, or any combination thereof. When implemented by using software, these functions can be stored in a computer-readable medium or transmitted as one or more instructions or code on a computer-readable medium. The computer-readable medium includes a computer storage medium and a communication medium, where the communication medium includes any medium that enables a computer program to be transmitted from one place to another. The storage medium can be any usable medium accessible to a general-purpose or special-purpose computer.

Some specific embodiments of this specification are described above. Other embodiments fall within the scope of the appended claims. In some cases, actions or steps described in the claims can be performed in an order different from an order in some embodiments and desired results can still be achieved. In addition, processes described in the accompanying drawings do not necessarily need a specific order or a sequential order shown to achieve the desired results. In some implementations, multi-tasking and parallel processing are also feasible or can be advantageous.

The objectives, technical solutions, and beneficial effects of this specification are further described in detail in the above-mentioned specific implementations. It should be understood that the above-mentioned descriptions are merely some specific implementations of this specification, but are not intended to limit the protection scope of this specification. Any modification, equivalent replacement, or improvement made based on the technical solutions in this specification shall fall within the protection scope of this specification.

What is claimed is:

1. A computer-implemented method for graph database data insertion, comprising:
   receiving an insert statement for a target graph database, wherein:
      the insert statement comprises at least an insert keyword and two or more element definition lists corresponding to two or more graphic elements, wherein:
         the two or more element definition lists corresponding to the two or more graphic elements comprise a first node definition list corresponding to a first node; and
         the first node definition list comprises a first node identifier of the first node and a first entity type of an entity represented by the first node;
      the insert statement comprises a conflict detection clause, wherein the conflict detection clause is used to determine whether a target data row conflicting with a primary key value of an inserted data row already exists in each data row;
      the two or more graphic elements comprise nodes and/or edges; and
      the two or more element definition lists are used to describe respective element identifiers of the two or more graphic elements and object types of objects represented by the two or more graphic elements, and each element definition list comprises each attribute value of each pre-described attribute of a corresponding graphic element; and
   executing the insert statement, comprising:
      forming each data row corresponding to each graphic element based on each attribute value in each element definition list;
      determining a primary key value of a corresponding data row based on an element identifier and an object type of each graphic element, comprising:
         determining the primary key value of the corresponding data row corresponding to for the first node based on the first node identifier and the first entity type; and
      inserting each data row into the target graph database based on the primary key value.

2. The computer-implemented method of claim 1, comprising:
   modifying the target data row when the target data row exists.

3. The computer-implemented method of claim 2, wherein:
   the conflict detection clause comprises a to-be-modified target attribute and a modified target attribute value or a modification expression.

4. The computer-implemented method of claim 3, wherein:
   modifying the target data row, comprises:
      modifying an attribute value of the to-be-modified target attribute in the target data row to the modified target attribute value; or
      modifying an attribute value of the to-be-modified target attribute in the target data row based on the modification expression.

5. The computer-implemented method of claim 2, comprising:
   returning an operation result notification comprising at least a quantity of successfully inserted data rows in each data row and a quantity of data rows with a conflicting primary key value.

6. The computer-implemented method of claim 1, wherein:
   the two or more element definition lists further comprise a second node definition list corresponding to a second node;
   the second node definition list comprises a second node identifier of the second node and a second entity type of an entity represented by the second node; and
   the first node identifier is different from the second node identifier, and/or the first entity type is different from the second entity type.

7. The computer-implemented method of claim 6, wherein:
   the first node definition list comprises a first variable name;
   the second node definition list comprises a second variable name; and
   the first variable name is different from the second variable name.

8. The computer-implemented method of claim 6, wherein:
   the two or more element definition lists comprise a third edge definition list connected between the first node definition list and the second node definition list by using predetermined connection signs and the third edge definition list comprises a third relationship type of a relationship represented by a third edge; and
   the first node, the third edge, and the second node form a first path.

9. The computer-implemented method of claim 8, wherein:
   determining a primary key value of a corresponding data row based on an element identifier and an object type of each graphic element, comprises:
      forming a third edge identifier of the third edge based on the first node identifier and the second node identifier.

10. The computer-implemented method of claim 9, comprising:
    determining a primary key value of a data row corresponding to the third edge based on the third edge identifier and the third relationship type.

11. The computer-implemented method of claim 1, wherein:
    the two or more element definition lists corresponding to the two or more graphic elements comprise a first edge definition list corresponding to a first edge;
    the first edge definition list comprises a first start identifier of a start node on the first edge, a first end identifier of an end node on the first edge, and a first relationship type of a relationship represented by the first edge; and
    the first start identifier and the first end identifier form a first edge identifier of the first edge.

12. The computer-implemented method of claim 11, wherein:
    determining a primary key value of a corresponding data row based on an element identifier and an object type of each graphic element, comprises:
       determining a primary key value of a data row corresponding to the first edge based on the first edge identifier and the first relationship type.

13. The computer-implemented method of claim 12, wherein:
    the first edge definition list comprises a first time stamp.

14. The computer-implemented method of claim 13, wherein:
  determining a primary key value of a data row corresponding to the first edge, comprises:
    determining the primary key value of the data row corresponding to the first edge based on a combination of the first edge identifier, the first relationship type, and the first time stamp.

15. The computer-implemented method of claim 12, wherein:
  the two or more element definition lists comprise a second edge definition list corresponding to a second edge;
  the second edge definition list comprises a second start identifier and a second end identifier of a start node and an end node on the second edge and a second relationship type of a relationship represented by the second edge; and
  the first start identifier is different from the second start identifier, and/or the first end identifier is different from the second end identifier, and/or the first relationship type is different from the second relationship type.

16. A non-transitory, computer-readable medium storing one or more instructions executable by a computer system to perform one or more operations, comprising:
  receiving an insert statement for a target graph database, wherein:
    the insert statement comprises at least an insert keyword and two or more element definition lists corresponding to two or more graphic elements, wherein:
      the two or more element definition lists corresponding to the two or more graphic elements comprise a first node definition list corresponding to a first node; and
      the first node definition list comprises a first node identifier of the first node and a first entity type of an entity represented by the first node;
    the insert statement comprises a conflict detection clause, wherein the conflict detection clause is used to determine whether a target data row conflicting with a primary key value of an inserted data row already exists in each data row;
    the two or more graphic elements comprise nodes and/or edges; and
    the two or more element definition lists are used to describe respective element identifiers of the two or more graphic elements and object types of objects represented by the two or more graphic elements, and each element definition list comprises each attribute value of each pre-described attribute of a corresponding graphic element; and
  executing the insert statement, comprising:
    forming each data row corresponding to each graphic element based on each attribute value in each element definition list;
    determining a primary key value of a corresponding data row based on an element identifier and an object type of each graphic element, comprising:
      determining the primary key value of the corresponding data row corresponding to for the first node based on the first node identifier and the first entity type; and
    inserting each data row into the target graph database based on the primary key value.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations, comprising:
  receiving an insert statement for a target graph database, wherein:
    the insert statement comprises at least an insert keyword and two or more element definition lists corresponding to two or more graphic elements, wherein:
      the two or more element definition lists corresponding to the two or more graphic elements comprise a first node definition list corresponding to a first node; and
      the first node definition list comprises a first node identifier of the first node and a first entity type of an entity represented by the first node;
    the insert statement comprises a conflict detection clause, wherein the conflict detection clause is used to determine whether a target data row conflicting with a primary key value of an inserted data row already exists in each data row;
    the two or more graphic elements comprise nodes and/or edges; and
    the two or more element definition lists are used to describe respective element identifiers of the two or more graphic elements and object types of objects represented by the two or more graphic elements, and each element definition list comprises each attribute value of each pre-described attribute of a corresponding graphic element; and
  executing the insert statement, comprising:
    forming each data row corresponding to each graphic element based on each attribute value in each element definition list;
    determining a primary key value of a corresponding data row based on an element identifier and an object type of each graphic element, comprising:
      determining the primary key value of the corresponding data row corresponding to for the first node based on the first node identifier and the first entity type; and
    inserting each data row into the target graph database based on the primary key value.

* * * * *